US010459423B2

United States Patent
Takeichi

(10) Patent No.: US 10,459,423 B2
(45) Date of Patent: Oct. 29, 2019

(54) EYEGLASS LENS PROCESSING APPARATUS AND EYEGLASS LENS PROCESSING PROGRAM

(71) Applicant: NIDEK CO., LTD., Gamagori, Aichi (JP)

(72) Inventor: Kyoji Takeichi, Aichi (JP)

(73) Assignee: NIDEK CO., LTD., Gamagori, Aichi (JP)

( * ) Notice: Subject to any disclaimer, the term of this patent is extended or adjusted under 35 U.S.C. 154(b) by 196 days.

(21) Appl. No.: 15/469,957

(22) Filed: Mar. 27, 2017

(65) Prior Publication Data
US 2017/0277161 A1    Sep. 28, 2017

(30) Foreign Application Priority Data

Mar. 28, 2016   (JP) .................... 2016-063312

(51) Int. Cl.
*G05B 19/18*    (2006.01)
*G05B 19/29*    (2006.01)
(Continued)

(52) U.S. Cl.
CPC .............. *G05B 19/29* (2013.01); *B24B 9/142* (2013.01); *B24B 9/148* (2013.01); *B24B 49/04* (2013.01);
(Continued)

(58) Field of Classification Search
CPC ......... B24B 9/148; B24B 51/00; B24B 13/06; B24B 47/22; B28D 1/143;
(Continued)

(56) References Cited

U.S. PATENT DOCUMENTS 5,384,987 A  *  1/1995  Wiand .................... B24B 9/14
                                                         451/177
6,328,635 B1 * 12/2001  Suzuki .................. B24B 9/146
                                                         451/255
(Continued)

FOREIGN PATENT DOCUMENTS

EP        2 436 481 A2     4/2012
EP        2 529 885 A2    12/2012
(Continued)

OTHER PUBLICATIONS

Search Report dated May 19, 2017 issued by the European Patent Office in counterpart European Patent Application No. 17163285.4.

*Primary Examiner* — Darrin D Dunn
(74) *Attorney, Agent, or Firm* — Sughrue Mion, PLLC

(57) ABSTRACT

An eyeglass lens processing apparatus includes: a processing tool configured to process a periphery of a lens; a movement portion configured to change a relative position between the lens and the processing tool; a positional data acquiring portion configured to acquire positional data related to a corner portion of an edge of the lens before the lens is finished and after the lens is roughed; a processing control data acquiring portion configured to acquire corner portion processing control data for removing a chip adhering to the lens through roughing, based on the positional data acquired by the positional data acquiring portion; and a processing control portion configured to control the movement portion based on the corner portion processing control data so as to remove the chip adhering to the lens.

11 Claims, 6 Drawing Sheets

(51) Int. Cl.
   *G02C 7/02* (2006.01)
   *B24B 49/04* (2006.01)
   *B24B 9/14* (2006.01)
(52) U.S. Cl.
   CPC ...... *G02C 7/02* (2013.01); *G05B 2219/45175* (2013.01)
(58) Field of Classification Search
   CPC .......... G05B 2219/45157; G05B 19/19; G05B 19/401; G05B 19/40937; G05B 19/4097; G05B 2219/36232; G05B 2219/45175; G05B 2219/50049; G05B 2219/50063; G05B 19/29; G05B 19/408; Y10T 29/49995; Y02P 80/40; B08B 15/04; B08B 1/00; B08B 1/002
   See application file for complete search history.

(56) References Cited

U.S. PATENT DOCUMENTS

| | | | | |
|---|---|---|---|---|
| 7,617,579 B2* | 11/2009 | Natsume | ................ | B24B 9/146 29/26 A |
| 8,366,512 B2* | 2/2013 | Takeichi | ................ | B24B 51/00 451/10 |
| 9,475,242 B2* | 10/2016 | Yamamoto | ....... | B29D 11/00961 |
| 9,561,572 B2* | 2/2017 | Takeichi | ................ | B24B 51/00 |
| 9,776,293 B2* | 10/2017 | Nakako | ............... | B24B 27/0076 |
| 2002/0045403 A1* | 4/2002 | Hatano | ................... | B24B 9/148 451/5 |
| 2002/0102930 A1 | 8/2002 | Eto et al. | | |
| 2003/0034281 A1* | 2/2003 | Kumar | ................. | B07C 5/3425 209/579 |
| 2003/0043343 A1* | 3/2003 | Diehl | ...................... | B23C 3/023 351/159.75 |
| 2003/0214627 A1* | 11/2003 | Samukawa | ........ | B23Q 11/0883 351/156 |
| 2004/0097168 A1* | 5/2004 | Igarashi | .................... | B23C 3/12 451/5 |
| 2005/0002560 A1* | 1/2005 | Yamamoto | ........... | G06K 9/3233 382/156 |
| 2005/0189666 A1 | 9/2005 | Hanssen | | |
| 2006/0073771 A1* | 4/2006 | mandler | .............. | B24B 13/0057 451/42 |
| 2006/0167758 A1* | 7/2006 | Yancy | .................... | G06Q 30/02 29/557 |
| 2006/0189255 A1* | 8/2006 | Akiyama | .............. | B24B 9/148 451/5 |
| 2006/0240747 A1* | 10/2006 | Natsume | .................. | B23C 3/12 451/5 |
| 2007/0015440 A1* | 1/2007 | Natsume | ................. | B24B 9/146 451/5 |
| 2007/0132945 A1* | 6/2007 | Haser | .................... | G02C 7/024 351/159.73 |
| 2007/0173176 A1* | 7/2007 | Kiontke | .................... | B24B 1/00 451/5 |
| 2007/0278139 A1* | 12/2007 | Cowling | ................... | B07C 5/36 209/606 |
| 2008/0184579 A1* | 8/2008 | McFarland | ............ | G01B 21/04 33/551 |
| 2009/0064512 A1* | 3/2009 | Matsuyama | ......... | G01B 5/0004 33/28 |
| 2009/0135371 A1* | 5/2009 | Joseph | .................... | B24B 13/06 351/159.75 |
| 2009/0170403 A1* | 7/2009 | Shibata | .................... | B24B 9/148 451/5 |
| 2010/0136885 A1* | 6/2010 | Takeichi | .................... | B24B 9/14 451/5 |
| 2010/0248590 A1* | 9/2010 | Shibata | ..................... | B24B 9/14 451/5 |
| 2011/0009036 A1* | 1/2011 | Shibata | ..................... | B24B 9/14 451/255 |
| 2011/0157554 A1* | 6/2011 | Kawai | .................. | A61B 3/1005 351/221 |
| 2012/0083186 A1* | 4/2012 | Shibata | .................. | B24B 9/148 451/5 |
| 2012/0133886 A1* | 5/2012 | Biton | ..................... | B24B 9/148 351/159.74 |
| 2012/0252315 A1* | 10/2012 | Natsume | ................ | B24B 9/14 451/5 |
| 2013/0203322 A1* | 8/2013 | Shibata | ................. | B24B 9/148 451/5 |
| 2013/0232774 A1* | 9/2013 | Nakako | ............... | B24B 27/0076 29/650 |
| 2014/0041184 A1* | 2/2014 | Schneider | ................. | B24B 9/14 29/407.04 |
| 2014/0199916 A1* | 7/2014 | Takeichi | ................. | B24B 51/00 451/5 |
| 2014/0297016 A1* | 10/2014 | Yamamoto | ....... | B29D 11/00932 700/109 |
| 2015/0004884 A1* | 1/2015 | Obayashi | ................ | B24B 9/148 451/256 |
| 2016/0114380 A1* | 4/2016 | Staats | ..................... | B08B 1/002 72/17.3 |
| 2017/0090214 A1* | 3/2017 | Honma | .................... | G02C 7/06 |
| 2018/0001435 A1* | 1/2018 | Hale | ..................... | B24B 9/148 |

FOREIGN PATENT DOCUMENTS

| | | |
|---|---|---|
| EP | 2 636 485 A2 | 9/2013 |
| JP | 11-090804 A | 4/1999 |
| JP | 2000-84814 A | 3/2000 |

* cited by examiner

EYEGLASS LENS PROCESSING APPARATUS AND EYEGLASS LENS PROCESSING PROGRAM

CROSS REFERENCE TO RELATED APPLICATION

This application is based upon and claims the benefit of priority of Japanese Patent Application No. 2016-063312 filed on Mar. 28, 2016, the contents of which are incorporated herein by reference in its entirety.

BACKGROUND

The present disclosure relates to an eyeglass lens processing apparatus processing a periphery of a lens, and an eyeglass lens processing program.

There is a known eyeglass lens processing apparatus which processes a periphery of a lens (eyeglass lens) by using a processing tool (for example, grindstone or machining cutter) such that the periphery fits the eyeglass frame shape. Recently, lenses adopting a thermoplastic material as the lens material are widely used, and various types of methods of processing the thermoplastic material lens (thermoplastic lens) have been proposed (for example, refer to JP-A-11-090804).

SUMMARY

Incidentally, when processing lenses formed of various types of materials, sometimes chips adhere to the lens after roughing the lens. Particularly, a thermoplastic lens has properties in which viscosity increases when heat is applied to the thermoplastic lens. Therefore, the chips are likely to adhere to the thermoplastic lens after the thermoplastic lens is subjected to roughing.

For example, if chips discharged during roughing adhere to the lens, sometimes the chips hinder a lens measurement when the lens measurement before finishing is performed, the measurement accuracy deteriorates, and the processing accuracy during finishing deteriorates. In addition, for example, if the chips discharged during roughing adhere to the lens, sometimes the chips, a processing tool, and the like come into contact with each other during finishing, and the processing accuracy deteriorates.

In consideration of the aforementioned problems of the technology in the related art, the present disclosure technically aims to provide an eyeglass lens processing apparatus in which chips adhering to a lens after roughing the lens can be removed and various types of lenses can be favorably processed, and an eyeglass lens processing program.

In order to solve the aforementioned problems, the present invention is provided with the following configuration.

An eyeglass lens processing apparatus comprising:

a processing tool configured to process a periphery of a lens;

a movement portion configured to change a relative position between the lens and the processing tool;

a positional data acquiring portion configured to acquire positional data related to a corner portion of an edge of the lens before the lens is finished and after the lens is roughed;

a processing control data acquiring portion configured to acquire corner portion processing control data for removing a chip adhering to the lens through roughing, based on the positional data acquired by the positional data acquiring portion; and a processing control portion configured to control the movement portion based on the corner portion processing control data so as to remove the chip adhering to the lens.

A method of processing a periphery of a lens by an eyeglass lens processing apparatus which includes a processing tool processing a lens, a movement portion configured to change a relative position between the lens and the processing tool, the method comprising:

a positional data acquiring step of acquiring positional data related to a corner portion of an edge of the lens before the lens is finished and after the lens is roughed;

a processing control data acquiring step of acquiring corner portion processing control data for removing a chip adhering to the lens through roughing, based on the positional data acquired through the positional data acquiring step; and a processing control step of controlling the movement portion based on the corner portion processing control data to remove the chips adhering to the lens.

DESCRIPTION OF ILLUSTRATIVE EMBODIMENTS

<Overview>

Figure 1:
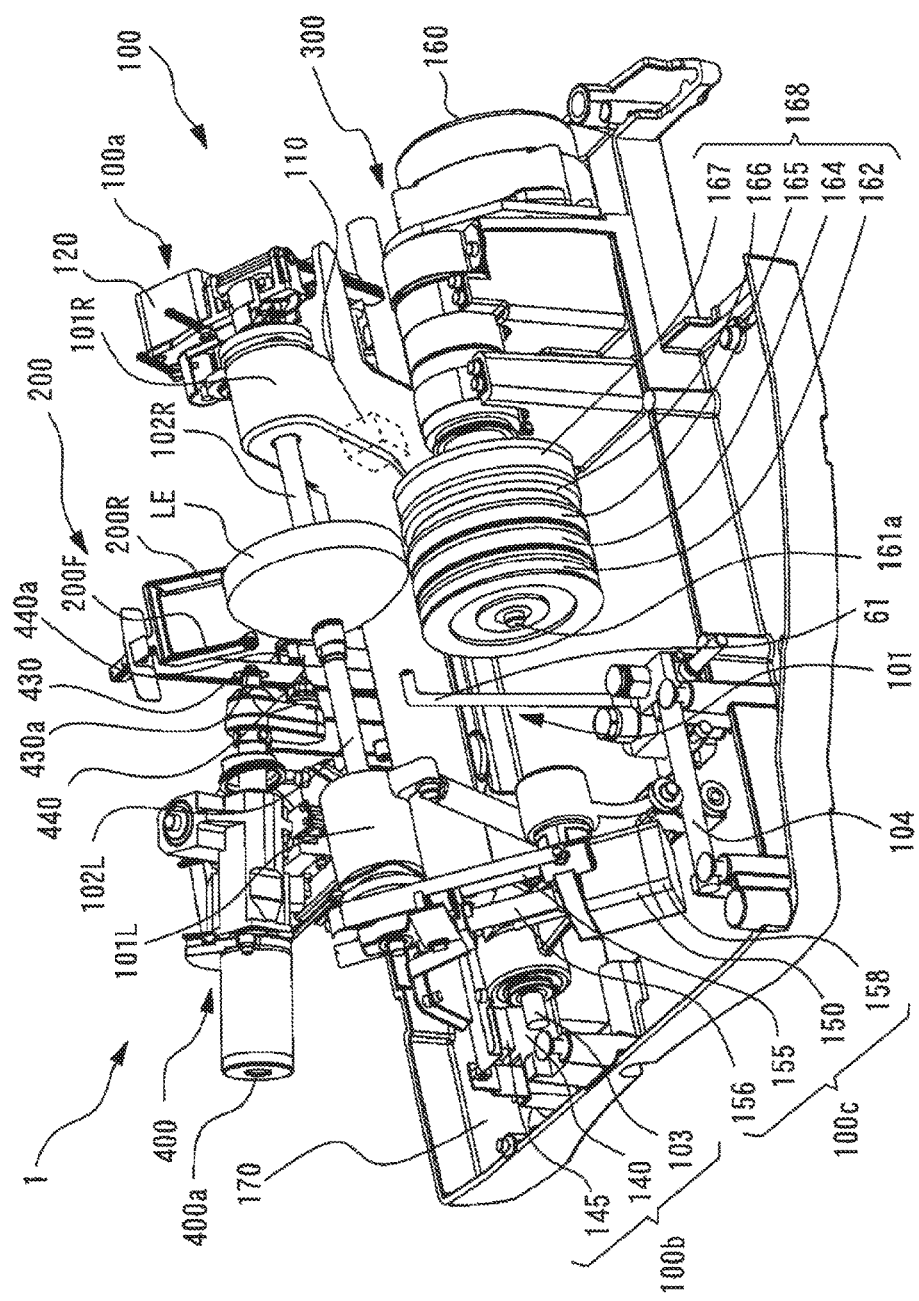
FIG. 1 is a view of a schematic configuration of a processing mechanism portion of an eyeglass lens processing apparatus.

Hereinafter, one of typical embodiments will be described with reference to the drawings. FIGS. 1 to 7B are views for describing an apparatus and a program according to the present embodiment. In the description below, description will be given by exemplifying an eyeglass lens processing apparatus. The items classified in brackets < > can be utilized independently or relationally.

For example, the eyeglass lens processing apparatus according to the present embodiment may include a processing tool, a movement portion, a positional data acquiring portion, a processing control data acquiring portion, a processing control portion, and the like. For example, the eyeglass lens processing apparatus in the present embodiment may include the positional data acquiring portion configured to acquire positional data related to a corner portion of an edge of a lens before finishing the lens and after roughing the lens; the processing control data acquiring portion configured to acquire corner portion processing control data for removing chips adhering to the lens through roughing, based on the positional data acquired by the positional data acquiring portion; and the processing control portion configured to control the movement portion based on the corner portion processing control data so as to remove the chips adhering to the lens. Naturally, the configuration of the eyeglass lens processing apparatus is not limited thereto.

For example, the eyeglass lens processing apparatus may be configured to also serve as at least any of the positional data acquiring portion, the processing control data acquiring portion, and the processing control portion. In addition, for example, the positional data acquiring portion, the processing control data acquiring portion, and the processing control portion may be configured to be separately provided.

<Processing Tool>

For example, the processing tool is acceptable as long as the processing tool is configured to be able to process a periphery of the lens. For example, a configuration using a grindstone, a cutter, a laser, or the like as the processing tool may be adopted. For example, as the processing tool, a configuration of using at least any processing tool of a roughing tool for roughing of a lens periphery, a finishing tool for performing finishing, a grooving tool for forming a groove in the lens periphery (for example, grooving tool 430), and a boring tool for performing boring on a refractive surface of a lens (for example, boring tool 440) may be adopted. That is, for example, the processing tool may be configured to include at least one or more processing tools.

For example, the roughing tool may be at least any of a rough grindstone for glass (for example, rough grindstone 162 for glass) and a rough grindstone for plastic (for example, rough grindstone 167 for plastic). For example, the roughing tool may be one rough grindstone dedicated for roughing. For example, the finishing tool may be at least any of a finishing grindstone having a V-groove (bevel groove) and forming a bevel on the lens, a grindstone for finishing a high-curve lens (for example, grindstone 166 for finishing a high-curve lens), a grindstone having a plano-processing surface for performing finishing, and a grindstone for flat-polishing (grindstone 165 for flat-polishing). In the present embodiment, a finishing grindstone (grindstone 164 for performing finishing) serving as both a V-groove (bevel groove) finishing grindstone for forming a bevel in the lens, and a grindstone having a plano-processing surface for performing finishing is used.

In the present embodiment, as the rough grindstone for glass and the rough grindstone for plastic, a rough grindstone having an inclined surface in at least any of both end portions of the grindstone is used. That is, in the present embodiment, in the rough grindstone for glass and the rough grindstone for plastic, at least any of both the end portions of the grindstone has a rib shape. In at least any rough grindstone of the rough grindstone for glass and the rough grindstone for plastic, a rough grindstone having an inclined surface in at least any of both the end portions of the grindstone may be used. In this manner, when using a rough grindstone having an inclined surface in at least any of both the end portions of the grindstone, the corner portion of the edge of the lens can be easily processed (chips can be easily removed). That is, when the lens or the grindstone is moved such that the corner portion of the edge of the lens (chips of lens) comes into contact with the end portion side of the rough grindstone, the lens can be easily processed by the inclined surface. The inclined surface provided in the rough grindstone in order to process the corner portion of the edge of the lens may be provided in a grindstone adjacent to the rough grindstone.

<Lens Holding Portion>

For example, the eyeglass lens processing apparatus according to the present embodiment may include a lens holding portion. For example, the lens holding portion (for example, lens holding portion 100) is used for holding a lens. For example, the lens holding portion has lens chuck shafts (for example, lens chuck shafts 102R and 102L) for holding a lens.

<Movement Portion>

For example, the movement portion is used to change relative positions between a lens (lens holding portion holding a lens) and the processing tool. For example, as the movement portion, a devise for moving the lens with respect to the processing tool can be exemplified. In addition, for example, as the movement portion, a devise for moving the processing tool with respect to the lens can be exemplified. In addition, for example, the movement portion may be configured to be able to move both the processing tool and the lens. The movement portion may change the relative positions between the lens and the processing tool by a drive portion (for example, motor).

For example, the movement portion may be an X-axis movement portion (for example, chuck shaft movement unit 100b) which moves between the relative positions of the lens and the processing tool in an X-axis direction (direction parallel to lens chuck shafts). In addition, for example, the movement portion may be a Y-axis movement portion (for example, shaft-to-shaft distance change unit 100c) which changes the relative positions between the lens and the processing tool in a Y-axis direction (direction of a shaft-to-shaft distance between the lens chuck shafts and a rotary shaft of the processing tool). In addition, for example, the movement portion may be a turning movement portion which changes the relative positions by turning at least any of the lens and the processing tool. In addition, for example, the movement portion may be at least any one movement portion of the X-axis movement portion, the Y-axis movement portion, and the turning movement portion. Naturally, the movement portion may be a movement portion for changing the relative positions between the lens and the processing tool in a direction different from the movement directions described above.

In the present embodiment, for example, the positional data acquiring portion (for example, control section 50) acquires the positional data related to the corner portion of the edge of the lens (intersection part of the surface of the edge of the lens, and the front surface of the lens or the rear surface of the lens) before finishing the lens and after roughing the lens. For example, a processing control data acquiring portion (for example, control section 50) acquires the corner portion processing control data for removing the chips adhering to the lens through roughing, based on the positional data acquired by the positional data acquiring portion. For example, the processing control portion (for example, control section 50) controls the movement portion based on the corner portion processing control data so as to remove the chips adhering to the lens.

For example, based on the positional data related to the corner portion of the edge of the lens before finishing the lens and after roughing the lens, the chips adhering to the lens through roughing are removed. For example, the technology of the present disclosure is particularly useful for a thermoplastic lens (thermoplastic material is adopted as the material of the lens) in which viscosity increases and the chips are more likely to adhere to the lens. In this manner, according to the technology of the present disclosure, since the chips adhering to the lens after roughing the lens can be removed, a lens shape measurement after roughing is performed can be accurately performed. Accordingly, finishing after roughing is performed can be accurately performed. That is, various types of lenses can be favorably processed.

<Positional Data Acquiring Portion>

The positional data acquiring portion will be described in more detail. For example, the positional data acquiring portion acquires the positional data related to the corner portion of the edge of the lens before finishing the lens and after roughing the lens. In the present embodiment, the positional data related to the corner portion of the edge of the lens before finishing the lens and after roughing the lens may be estimated positional data (data of the corner portion in a lens after roughing the lens which is estimated based on lens shape data before performing roughing), instead of the positional data acquired by measuring the lens after roughing is actually performed.

For example, the positional data related to the corner portion of the edge may be positional data of the corner portion of the edge. In addition, for example, the positional data related to the corner portion of the edge may be positional data of a peripheral region of the corner portion of the edge. For example, the positional data related to the corner portion of the edge is acceptable as long as the positional data is at least any positional data of the positional data of the edge corner portion on the front surface side of the lens, and the positional data of the edge corner portion on the rear surface side of the lens. For example, the positional data of the edge corner portion may be acquired for each directional angle of radius vector of the lens. In addition, for example, the positional data of the edge corner portion may be acquired in only a predetermined region of the lens. Naturally, for example, the predetermined region in which the positional data of the edge corner portion is acquired may be arbitrarily set by a processing person.

For example, the positional data acquiring portion may be configured to acquire the positional data by performing computation processing based on various types of data (for example, lens shape data and target lens shape data). In addition, for example, the positional data acquiring portion may be configured to acquire the positional data by receiving the positional data. In this case, for example, the positional data acquiring portion may be configured to acquire the positional data by receiving the positional data which is input when the processing person operates an operation portion. In addition, in this case, for example, the positional data acquiring portion may be configured to acquire the positional data by receiving the positional data separately transferred from a different device.

For example, the positional data acquiring portion may calculate the positional data related to the corner portion of the edge of the lens before finishing the lens and after roughing the lens, based on the lens shape data configured by measuring the shape of the lens, and the target lens shape data. For example, the lens shape data may be acquired by a lens shape acquiring portion. In the present embodiment, as the lens shape data used for calculating the positional data, the lens shape data before performing roughing is used. For example, when the positional data is calculated based on the lens shape data and the target lens shape data, data of the position of the edge of the lens after being roughing the lens can be accurately acquired.

For example, the lens shape data may be at least any of the edge thickness (thickness of the edge), the refractive surface shape (curve value) of the front surface of the lens, and the refractive surface shape (curve value) of the rear surface of the lens.

For example, the lens shape data may be acquired by a lens shape data acquiring portion. For example, the lens shape data acquiring portion may be configured to acquire the lens shape data by measuring a lens with a lens shape measuring portion (for example, lens shape measuring unit 200). In this case, for example, the lens shape measuring portion may include a tracing stylus and measure a lens such that the tracing stylus comes into contact with the refractive surface of the lens in order to measure the refractive surface shape of the lens (front surface and rear surface of the lens). In addition, in this case, for example, the lens shape measuring portion may include a light emitting optical system and a light receiving optical system and measure a lens by irradiating the lens with a light flux by the light emitting optical system and receiving the reflected light thereof by the light receiving optical system.

In addition, for example, the lens shape data acquiring portion may be configured to acquire the lens shape data by receiving the lens shape data. In this case, for example, the lens shape data acquiring portion may be configured to acquire the lens shape data by receiving the lens shape data which is input when the processing person operates the operation portion. In addition, in this case, for example, the lens shape data acquiring portion may be configured to acquire the lens shape data by receiving the lens shape data separately transferred from a different device.

For example, the target lens shape data may be acquired by the target lens shape data acquiring portion. For example, the target lens shape data acquiring portion may be configured to acquire the target lens shape data by measuring a frame or a demonstration lens with a target lens shape measuring portion (for example, tracer). In addition, for example, the target lens shape data acquiring portion may be configured to acquire the target lens shape data by receiving the target lens shape data. In this case, for example, the target lens shape data acquiring portion may be configured to acquire the target lens shape data by receiving the target lens shape data which is input when the processing person operates the operation portion. In addition, in this case, for example, the target lens shape data acquiring portion may be configured to acquire the target lens shape data by receiving the target lens shape data separately transferred from a different device.

<Processing Control Data Acquiring Portion>

The processing control data acquiring portion will be described in more detail. For example, the processing control data acquiring portion acquires the corner portion processing control data for removing the chips adhering to the lens through roughing, based on the positional data acquired by the positional data acquiring portion. The removing of the chips adhering to the lens through roughing is not limited to a configuration in which the chips are completely removed. A configuration of reducing the chips may be adopted.

For example, the corner portion processing control data may be acquired for each directional angle of radius vector of the lens. In addition, for example, the corner portion processing control data may be acquired in only a predetermined region of the lens. Naturally, for example, the predetermined region in which the corner portion processing control data is acquired may be arbitrarily set by the processing person.

For example, as the corner portion processing control data for removing the chips adhering to the lens through roughing, the corner portion processing control data for processing the corner portion of the edge may be acquired based on the positional data acquired by the positional data acquiring portion, by causing the processing tool and the corner portion of the edge of the lens after roughing the lens to come into contact with each other. For example, as the processing of the corner portion of the edge performed by causing the processing tool and the corner portion of the edge of the lens after roughing the lens to come into contact with each other, a configuration of removing the chips by processing the region of the corner portion of the edge may be adopted. For example, as the processing of the corner portion of the edge performed by causing the processing tool and the corner portion of the edge of the lens after roughing the lens to come into contact with each other, a configuration of processing the corner portion of the edge by causing the corner portion of the edge and the processing tool to come into contact with each other may be adopted. In addition, for example, as the processing of the corner portion of the edge performed by causing the processing tool and the corner portion of the edge of the lens after roughing the lens to come into contact with each other, a configuration of processing the corner portion of the edge or the peripheral region of the corner portion of the edge by causing the peripheral region of the corner portion of the edge and the processing tool to come into contact with each other may be adopted. In addition, for example, as the processing of the corner portion of the edge performed by causing the processing tool and the corner portion of the edge of the lens after roughing the lens to come into contact with each other, a configuration of processing the chips by causing the processing tool to come into contact with the chips adhering to the region of the edge corner portion may be adopted.

<Processing Control Portion>

The processing control portion will be described in more detail. For example, the processing control portion controls the movement portion based on the corner portion processing control data so as to remove the chips adhering to the lens. The removing of the chips adhering to the lens is not limited to a configuration in which the chips are completely removed. A configuration of reducing the chips may be adopted.

For example, the configuration of controlling the movement portion based on the corner portion processing control data so as to remove the chips adhering to the lens may be a configuration of controlling the movement portion based on the corner portion processing control data so as to process the corner portion of the edge of the lens. In this manner, for example, when the corner portion of the edge of the lens is processed based on the positional data related to the corner portion of the edge of the lens before finishing the lens and after roughing the lens, the chips adhering to the lens through roughing can be accurately removed.

For example, as controlling the movement portion based on the corner portion processing control data so as to process the corner portion of the edge of the lens, a configuration of removing the chips by processing the region of the corner portion of the edge may be adopted. In this case, for example, as controlling the movement portion based on the corner portion processing control data so as to process the corner portion of the edge of the lens, a configuration of processing the corner portion of the edge by causing the corner portion of the edge and the processing tool to come into contact with each other may be adopted. In addition, for example, as controlling the movement portion based on the corner portion processing control data so as to process the corner portion of the edge of the lens, a configuration of processing the corner portion of the edge or the peripheral region of the corner portion of the edge by causing the peripheral region of the corner portion of the edge and the processing tool to come into contact with each other may be adopted. In addition, for example, as controlling the movement portion based on the corner portion processing control data so as to process the corner portion of the edge of the lens, a configuration of processing the chips by causing the processing tool to come into contact with the chips adhering to the region of the edge corner portion may be adopted.

For example, as the configuration of the movement portion when controlling the movement portion based on the corner portion processing control data so as to process the corner portion of the edge of the lens, various types of movement portions can be used. For example, as the movement portion when the corner portion of the edge is processed, the X-axis movement portion may be used. In this case, for example, with respect to the roughing tool having the inclined surfaces in both end portions, the X-axis movement portion is driven based on the corner portion processing control data. When the lens or the processing tool is shifted in the X-axis direction, the lens comes into contact with the inclined surface of the end portion of the roughing tool, and the corner portion of the edge of the lens is processed. In addition, for example, as the movement portion when the corner portion of the edge is processed, the turning movement portion may be used. In this case, for example, the turning movement portion is driven based on the corner portion processing control data. The lens or the processing tool comes into contact with the roughing tool in a state of being turned, and the corner portion of the edge of the lens is processed. In this case, the roughing tool having the inclined surfaces in both end portions does not have to be used.

For example, the processing of the corner portion of the edge (removing of chips) is acceptable as long as the processing is configured to be executed before at least the lens measurement for finishing is performed. In addition, for example, in a case where the lens measurement for finishing is not performed, the processing of the corner portion of the edge is acceptable as long as the processing is configured to be executed at least before finishing is performed. In these cases, for example, in the processing of the corner portion of the edge, the processing may be configured to be simultaneously performed during roughing of the lens. In addition, for example, the processing of the edge may be configured to be performed after roughing is performed.

For example, when the corner portion of the edge is processed, the processing may be configured to be performed through an up-cut method. For example, the processing control portion performs processing through the up-cut method when the corner portion of the edge is processed. For example, when the corner portion of the edge of the lens is processed, if the processing is performed through the up-cut method, in a case where the thermoplastic lens is processed, the chips generated when the corner portion of the edge is processed can be restrained from adhering to the lens after the corner portion of the edge is processed. Accordingly, the lens shape measurement after roughing is performed can be more accurately performed, and finishing after roughing is performed can be more accurately performed.

<Chips Removal>

For example, after roughing the lens by controlling the movement portion based on roughing control data, the processing control portion may control the movement portion based on the corner portion processing control data so as to process the corner portion of the edge of the lens after roughing the lens to remove the chips adhering to the lens through roughing. For example, when the corner portion of the edge of the lens is processed after roughing the lens, the chips adhering to the lens after roughing the lens can be more favorably removed. Accordingly, the lens shape measurement after roughing is performed can be more accurately performed, and finishing after roughing is performed can be more accurately performed. For example, the corner portion processing control data may be included in the roughing control data (processing control data for roughing). Naturally, the corner portion processing control data and the roughing control data may be individually stored in a memory as separate pieces of processing control data.

For example, as roughing, various types of methods for roughing can be used. For example, as roughing, after performing roughing of a first stage in which the processing tool cuts the lens without rotating the lens in a plurality of lens rotation angle directions by controlling the movement portion based on the roughing control data, the processing control portion may perform roughing of the lens by performing roughing of a second stage in which processing is performed by using the processing tool while the lens is rotated. In this case, for example, as the processing tool used when roughing of the first stage is performed and the processing tool used when roughing of the second stage is performed, the same processing tools may be used or processing tools different from each other may be used. Naturally, the processing tool to be used may be able to be appropriately set by the processing person. For example, in roughing of the lens, after performing roughing of the first stage in which the processing tool cuts the lens without rotating the lens in the plurality of lens rotation angle directions, when roughing of the second stage in which processing is performed by using the processing tool while the lens is rotated is performed, axial misalignment generated when the lens is processing can be restrained and processing can be performed. For example, particularly, when a thermoplastic lens is processed, after performing roughing through roughing of the first stage and roughing of the second stage, the corner portion of the edge of the lens is processed. Accordingly, axial misalignment during lens processing can be restrained and the chips adhering to the lens after roughing the lens can be more favorably removed, thereby being more useful.

In addition, for example, as roughing, after performing roughing of the first stage in which the processing tool cuts the lens without rotating the lens by controlling the movement portion based on the roughing control data, the processing control portion may be configured to perform roughing of the second stage in which processing is performed by using the processing tool while the lens is rotated from a state where roughing of the first stage is performed (state where cutting is performed).

In addition, for example, as roughing, the processing control portion may be configured to control the movement portion based on the roughing control data so as to perform roughing in which processing is performed by using the processing tool while the lens is rotated. In this case, roughing may be performed while checking a load applied to the lens, the rotational speed, the time to change the distance between the lens and the processing tool, and the like.

In the configuration described above, a configuration in which after performing roughing of the lens, the movement portion is controlled based on the corner portion processing control data so as to process the corner portion of the edge of the lens after roughing the lens is exemplified. However, the configuration is not limited thereto. In the processing of the corner portion of the edge, the processing may be configured to be simultaneously performed during roughing of the lens. For example, the processing control data acquiring portion acquires the roughing control data such that the corner portion of the edge comes into contact with the processing tool. The processing control portion controls the movement portion based on the acquired roughing control data so as to perform roughing while process the corner portion of the edge and remove the chips generated when roughing is performed. In this case, for example, by using the roughing tool having the inclined surfaces in both end portions, the corner portion of the edge may be controlled so as to comes into contact with the inclined surfaces of both end portions of the roughing tool and the edge of the lens (edge surface) may be controlled so as to come into contact with the processing surface (planar part) of the roughing tool.

The eyeglass lens processing apparatus of the present embodiment may further include a supply portion (for example, nozzle 61 for lens processing) and a supply control portion (for example, control section 50). For example, the supply portion supplies processing water in a direction toward a contact position between the lens and the processing tool when the lens is processed. For example, the supply control portion stops supplying of the processing water from the supply portion when the corner portion of the edge is processed. For example, by stopping supplying of the processing water when the corner portion of the edge of the lens is processed, the thermoplastic lens can be restrained from being cooled by the processing water when the thermoplastic lens is processed, and the processing can be restrained from not advancing. That is, in the processing of the thermoplastic lens, since the lens melts due to heat generated during processing, the lens is restrained from being cooled by the processing water. Accordingly, the lens can be restrained from not being able to be favorably processed (for example, the chips adhering to the lens can be restrained from not being able to be favorably removed, or the like). For example, a configuration of supplying the processing water in the direction toward the contact position is acceptable as long as the processing water is configured to be supplied toward a processing position at which the lens and the processing tool come into contact with each other and processing is performed. In this case, for example, the configuration of supplying the processing water in the direction toward the contact position may be a configuration of supplying the processing water toward the processing tool. In addition, for example, the configuration of supplying the processing water in the direction toward the contact position may be a configuration of supplying the processing water toward the lens.

In the present embodiment, after the chips are removed, the lens shape measurement for finishing may be performed. For example, the processing control data acquiring portion acquires finishing control data for finishing the lens based on the lens shape data acquired by controlling the lens shape measuring portion (for example, lens shape measuring unit 200) to measure the shape of the lens after the chips adhering to the lens are removed by the processing tool. For example, the processing control portion controls the movement portion based on the finishing control data so as to perform finishing of the lens. For example, as finishing, flat-finishing (plano-processing), beveling, and the like can be exemplified.

In the present embodiment, chamfering may be performed after finishing is performed. For example, the processing control data acquiring portion processes the corner portion of the edge of the lens after finishing the lens. For example, the processing control portion controls the movement portion based on chamfering control data so as to process the corner portion of the edge of the lens after finishing the lens.

In this case, for example, the chamfering control data may be acquired by measuring the shape of the lens after roughing the lens.

The technology of the present disclosure is not limited to only being applied to the apparatus disclosed in the present embodiment. For example, eyeglass lens processing software (program) for performing the functions of the embodiment described above is supplied to a system or the apparatus via a network, various types of storage mediums, or the like. The program can be read and executed by a computer (for example, CPU or the like) of the system or the apparatus.

EXAMPLE

Hereinafter, Example of the present disclosure will be described based on the drawings. FIG. 1 is a view of a schematic configuration of a processing mechanism portion of the eyeglass lens processing apparatus.

For example, an eyeglass lens processing apparatus 1 includes the lens holding portion 100, the lens shape measuring unit 200, a first processing tool unit 300, and a second processing tool unit 400. For example, the lens holding portion 100 has the lens chuck shafts 102R and 102L for holding a lens (for example, eyeglass lens) LE. For example, the lens shape measuring unit 200 includes the tracing stylus which comes into contact with the refractive surface of the lens in order to measure the refractive surface shape of the lens (front surface and rear surface of the lens). For example, the first processing tool unit 300 rotates a processing tool rotary shaft (grindstone spindle) 161a to which a first processing tool 168 for processing the periphery of the lens is attached. For example, the second processing tool unit 400 includes a second processing tool 430 and a third processing tool 440 for processing the periphery of the lens.

For example, the lens holding portion 100 includes a lens rotation unit 100a, the chuck shaft movement unit 100b, and the shaft-to-shaft distance change unit 100c. For example, the lens rotation unit 100a rotates a pair of the lens chuck shafts 102R and 102L.

For example, a chuck shaft movement unit (X-directional movement unit) 100b moves the lens chuck shafts 102R and 102L in an axial direction (this will be referred to as X-direction). For example, a shaft-to-shaft distance change unit (Y-directional movement unit) 100c moves the lens chuck shafts 102R and 102L in a direction of approaching or being separated from (Y-direction) the grindstone spindle 161a, a processing tool drive shaft 430a to which a second lens processing tool 430 is attached, or a processing tool drive shaft 440a to which a third lens processing tool 440 is attached.

For example, the Y-directional movement unit 100c also serves as a lens movement unit relatively moving the lens LE in a direction in which the distance between the lens chuck shafts 102R and 102L and the lens shape measuring unit 200 varies. The lens chuck shafts 102R and 102L are moved in the forward/rearward and right/left directions (XY-directions) when the shape of the lens LE is measured and when the periphery of the lens LE is processed.

Hereinafter, a specific example of a processing apparatus main body 1 will be described in detail. The lens holding portion 100 is mounted on a base 170 of the processing apparatus main body 1. The lens chuck shaft 102L is rotatably and coaxially held by a left arm 101L of a carriage 101 of the lens holding portion 100, and the lens chuck shaft 102R is rotatably and coaxially held by a right arm 101R, respectively. The lens chuck shaft 102R is moved to the lens chuck shaft 102L side by a motor 110 attached to the right arm 101R, and the lens LE is held by the two lens chuck shafts 102R and 102L. In addition, the two lens chuck shafts 102R and 102L are synchronized and rotated by a motor 120 attached to the right arm 101R via a rotation transmission mechanism such as a gear. Accordingly, the lens rotation unit 100a is configured.

The carriage 101 is mounted in an X-axis movement support base 140 which can move along shafts 103 and 104 extending so as to be parallel to the lens chuck shafts 102R and 102L and the grindstone spindle 161a. In a rear portion of the support base 140, a ball screw (not illustrated) extending so as to be parallel to the shaft 103 is attached, and the ball screw is attached to a rotary shaft of a motor 145 for X-axis movement. In accordance with rotation of the motor 145, the carriage 101 linearly moves in the X-direction (axial direction of lens chuck shafts) together with the support base 140. Accordingly, the X-directional movement unit 100b is configured. The rotary shaft of the motor 145 is provided with an encoder (not illustrated) which is a detector detecting movement of the carriage 101 in the X-direction.

In addition, in the present Example, movement positions of the lens chuck shafts 102R and 102L in the X-direction detected by the encoder (not illustrated) which serves as a sensor are used when obtaining the refractive surface shapes of the front surface and the rear surface of the lens.

In the support base 140, a shaft 156 extending in a direction of connecting the lens chuck shafts 102R and 102L and a grindstone rotary shaft 161a is fixed. The Y-directional movement unit 100c is configured to move in a direction in which the shaft-to-shaft distance between the lens chuck shafts 102R and 102L and the grindstone rotary shaft 161a varies (Y-direction) while having the shaft 103 as the center. The Y-directional movement unit of this apparatus has a configuration in which the lens chuck shafts 102R and 102L turn while having the shaft 103 as the center. However, the distance between the lens chuck shafts 102R and 102L and the grindstone rotary shaft 161a may be configured to linearly change.

A motor 150 for Y-axis movement is fixed to the support base 140. Rotation of the motor 150 is transmitted to a ball screw 155 extending in the Y-direction, and the carriage 101 is moved in the Y-direction due to rotation of the ball screw 155. Accordingly, the Y-directional movement unit 100c is configured. The rotary shaft of the motor 150 is provided with an encoder 158 which is a detector detecting movement of the carriage 101 in the Y-direction.

In FIG. 1, the lens shape measuring unit 200 and the second processing tool unit 400 are provided above the carriage 101, that is, a position in a direction opposite to a first lens processing tool 168 via the carriage 101.

<Lens Shape Measuring Unit>

For example, the lens shape measuring unit 200 is fixed to the base 170 of the processing apparatus main body 1. For example, the lens shape measuring unit 200 includes a lens edge position measuring unit 200F and a lens edge position measuring unit 200R. For example, the lens edge position measuring unit 200F has the tracing stylus which comes into contact with the front surface of the lens LE. In addition, for example, the lens edge position measuring unit 200R has the tracing stylus which abuts on the rear surface of the lens LE. In a state where both the tracing styli of the lens edge position measuring unit 200F and the lens edge position measuring unit 200R are respectively in contact with the front surface of the lens LE and the rear surface, when the carriage 101 moves in the Y-axis direction and the lens LE rotates based on the target lens shape data, edge positions of the front surface of the lens and the rear surface of the lens for processing the lens periphery are simultaneously measured. For example, as the configurations of the lens edge position measuring units 200F and 200R, the configurations disclosed in JP-A-2003-145328 can be used.

<First Processing Tool Unit>

For example, on a base portion 170, the first processing tool unit 300 is disposed on a side (opposite side) facing the lens shape measuring unit 200 while interposing the carriage 101 therebetween. For example, the first processing tool unit includes the first processing tool 168 which is one of the lens processing tools. For example, the first processing tool 168 is configured to have the rough grindstone 162 for glass, the grindstone 164 for performing finishing having the V-groove (bevel groove) for forming the bevel in the lens and the plano-processing surface, the grindstone 165 for flat-polishing, the grindstone 166 for finishing the high-curve lens, the rough grindstone 167 for plastic, and the like. Naturally, the first processing tool 168 may have a different configuration. For example, the first processing tool 168 is coaxially attached to the grindstone rotary shaft (grindstone spindle) 161a.

In the present Example, as the rough grindstone 162 for glass and the rough grindstone 167 for plastic, a rough grindstone having an inclined surface in at least any of both the end portions of the grindstone is used. In at least any rough grindstone of the rough grindstone for glass and the rough grindstone for plastic, a rough grindstone having an inclined surface in at least any of both the end portions of the grindstone may be used. In the present embodiment, description will be given by exemplifying a case where the rough grindstone having the inclined surfaces in both the end portions of the grindstone is used as the rough grindstone 162 for glass and the rough grindstone 167 for plastic.

For example, the grindstone rotary shaft 161a is rotated by a motor 160. The lens LE sandwiched by the lens chuck shafts (lens rotary shafts) 102L and 102R included in the carriage 101 is in press-contact with the first lens processing tool 168, and the periphery thereof is processed. For example, in order to efficiently perform roughing and finishing of the periphery of the lens, the first processing tool 168 is configured to have a large diameter ranging approximately from 60 to 160 mm. Naturally, in regard to the diameter of the first processing tool 168, a grindstone of various types of diameters can be used.

<Second Processing Tool Unit>

Figure 2A:
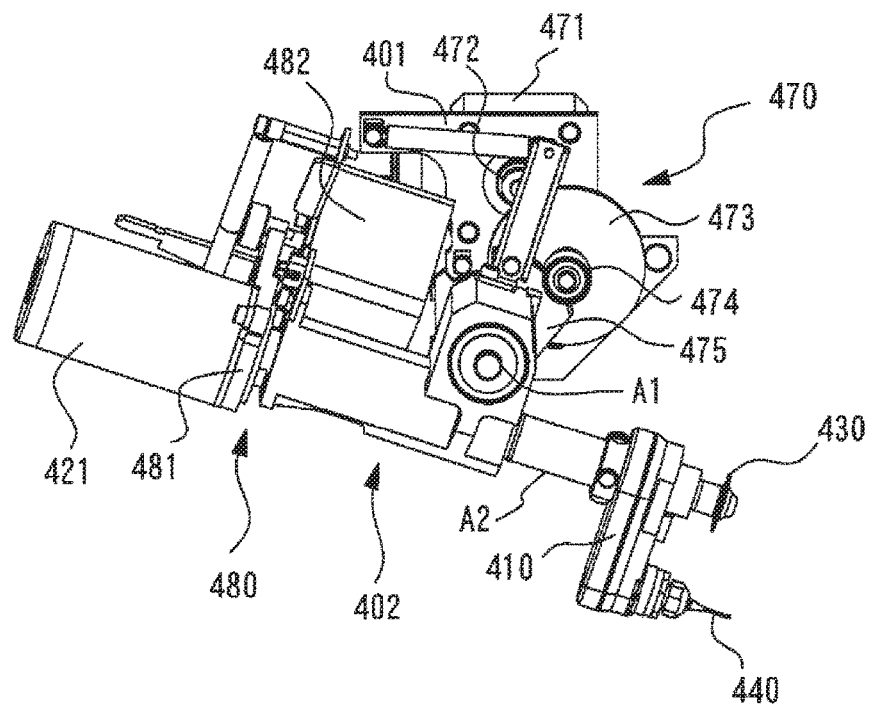
FIGS. 2A and 2B are views of a schematic configuration illustrating the appearance of a second processing tool unit.
Figure 2B:
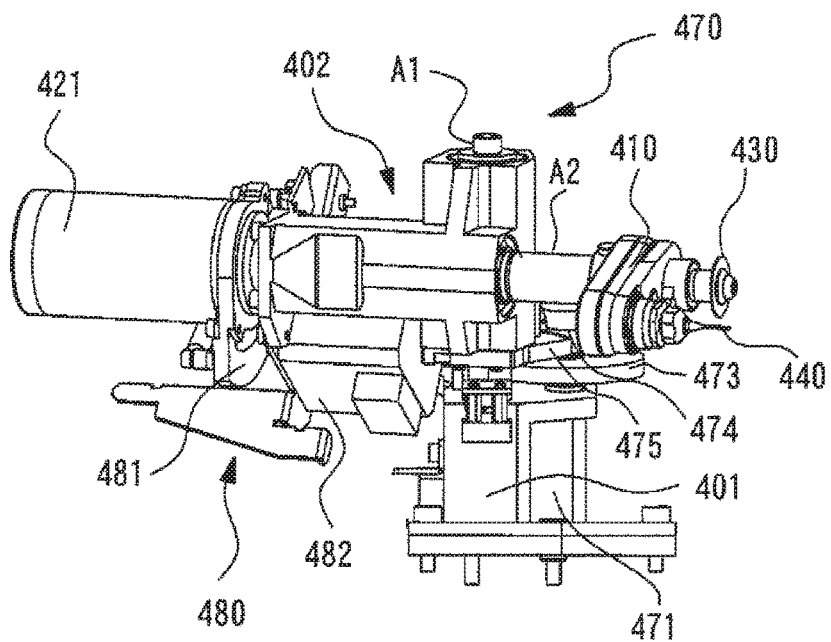

FIGS. 2A and 2B are views of a schematic configuration illustrating the appearance of the second processing tool unit 400. FIG. 2A is a top view when the second processing tool unit 400 is viewed in a direction from above (above on the sheet of FIG. 1). FIG. 2B is a side view when the second processing tool unit 400 is viewed from the side.

For example, the second processing tool unit 400 includes the second processing tool 430, the third processing tool 440, a first turning unit (first turning portion) 470, a second turning unit (second turning portion) 480, a drive portion (motor) 421, and the like. For example, the third processing tool 440 is held by a holding portion 410 while being interlocked with the second processing tool 430. For example, the first turning unit is used as a first actuator. In addition, for example, the second turning unit is used as a second actuator.

For example, the second processing tool 430 is attached to a drive shaft (processing tool drive shaft) 400a via the processing tool drive shaft 430a. For example, in the present embodiment, as the second processing tool 430, the finishing tool is used. In the present embodiment, as the finishing tool, the processing tool for performing grooving in the periphery of the lens is used. Naturally, the second processing tool 430 is not limited to the processing tool for grooving. Various types of processing tools (for example, processing tool for chamfering, processing tool for forming a bevel, processing tool for forming a step, processing tool for forming a hole, and the like) may be used.

For example, the second processing tool 430 is interlocked with the processing tool drive shaft 430a. For example, the processing tool drive shaft 430a is disposed inside a second rotary shaft A2 (will be described later). The processing tool drive shaft 430a is pivotally supported by a bearing (not illustrated) so as to be rotatable with respect to the second rotary shaft A2. For example, the processing tool drive shaft 430a is interlocked with the processing tool drive shaft 400a of the motor 421 via an interlock member (not illustrated). Accordingly, the second processing tool 430 and the motor 421 are directly connected to each other. That is, in the present embodiment, the processing tool drive shaft 430a of the second processing tool 430 and the processing tool drive shaft 400a of the motor 421 are coaxially disposed. Naturally, the processing tool drive shaft 430a of the second processing tool 430 and the processing tool drive shaft 400a of the motor 421 may be disposed on axes different from each other.

For example, when the motor 421 rotates, the second processing tool 430 rotates while having the processing tool drive shaft 430a as the rotation center. In this case, the processing tool drive shaft 430a of the second processing tool 430 becomes the processing tool rotary shaft. In a state where the second processing tool 430 rotates, when the lens LE sandwiched by the lens chuck shafts (lens rotary shafts) 102L and 102R included in the carriage 101 is in press-contact with the second processing tool 430, the lens periphery is processed.

For example, the third processing tool 440 is attached to the processing tool drive shaft 440a. For example, in the present embodiment, as the third processing tool 440, a processing tool for performing boring in the lens is used. Naturally, the third processing tool 440 is not limited to the boring tool. Various types of processing tools (for example, processing tool for chamfering, processing tool for forming a bevel, processing tool for forming a step, processing tool for forming a hole, and the like) may be used.

For example, the third processing tool 440 is interlocked with the processing tool drive shaft 440a. For example, the processing tool drive shaft 440a is pivotally supported by two bearings (not illustrated) so as to be rotatable with respect to the holding portion 410. For example, the processing tool drive shaft 440a is interlocked with the processing tool drive shaft 400a of the motor 421 via the processing tool drive shaft 430a. In the present Example, the processing tool drive shaft 440a of the third processing tool 440 is disposed at a position different from that on the axis of the processing tool drive shaft 400a of the motor 421. That is, rotation of the processing tool drive shaft 400a of the motor 421 is transmitted to the processing tool drive shaft 440a via a one-way clutch (hereinafter, will be disclosed as clutch), the bearings, and the like. Accordingly, rotation of the processing tool drive shaft 400a of the motor 421 is transmitted to the processing tool drive shaft 440a of the third processing tool 440. Naturally, as the configuration of transmitting driving of the motor 421 to the third processing tool, various types of configurations can be applied.

The relative positional relationship between the lens LE sandwiched by the lens chuck shafts (lens rotary shafts) 102L and 102R included in the carriage 101, and the third processing tool 440 is adjusted, and boring of the lens LE is performed. In the present Example, the processing tool drive shaft 440*a* to which the third processing tool 440 is attached becomes the processing tool rotary shaft such that the third processing tool 440 is rotated by the motor 421 while having the processing tool drive shaft 440*a* as the rotation center.

In the present Example, the second processing tool 430 and the third processing tool 440 share the drive portion. For example, the motor 421 serves as a drive source for both the second processing tool 430 and the third processing tool 440. In the present Example, the motor 421 can rotate the processing tool drive shaft 400*a* in the forward direction and the reverse direction. For example, in the present Example, the second processing tool unit 400 is configured to transmit rotation of the processing tool drive shaft 400*a* to the processing tool drive shaft 430*a* to which the second processing tool 430 is attached, in a case where the processing tool drive shaft 400*a* of the motor 421 is rotated in one direction of the forward direction and the reverse direction by using the clutch. In addition, for example, the second processing tool unit 400 is configured to transmit rotation of the processing tool drive shaft 400*a* to the processing tool drive shaft 440*a* to which at least the third processing tool 440 is attached, in a case where the processing tool drive shaft 400*a* of the motor 421 is rotated in the other direction by using the clutch. Accordingly, in the configuration, when the rotational direction of the processing tool drive shaft 400*a* of the motor 421 is controlled, driving is switched between the processing tool drive shaft 430*a* to which the second processing tool 430 is attached and the processing tool drive shaft 440*a* to which the third processing tool 440 is attached. There is no need for the rotational direction of the processing tool drive shaft 400*a* of the motor 421 and the rotational direction of the processing tool drive shaft 430*a* to be coincide with each other. For example, the rotational directions may be configured such that the rotational direction of the processing tool drive shaft 400*a* of the motor 421 and the rotational direction of the processing tool drive shaft 430*a* are different from each other. In the present Example, the rotational direction of the processing tool drive shaft 400*a* of the motor 421 and the rotational direction of the processing tool drive shaft 430*a* are the same rotational directions.

<First Turning Unit>

As illustrated in FIGS. 2A and 2B, for example, the first turning unit 470 includes a first rotary shaft A1, a motor 471, a gear 472, a gear 473, a strut 474, a gear 475, a base portion 402, and the like. In the present Example, the motor 471 can rotate the drive shaft (rotary shaft) in the forward direction and the reverse direction. For example, the first rotary shaft A1 is disposed inside the base portion 402 and is fixed to a support base block 401. For example, the base portion 402 is interlocked with the first rotary shaft A1 via a bearing (not illustrated) and is turnably held with respect to the support base block 401 while having the first rotary shaft A1 as the center. For example, the gear 472 is attached to the drive shaft of the motor 471. Accordingly, when the motor 471 is driven, the gear 472 rotates. For example, the gear 472 is meshed with the gear 473. For example, the gear 473 is interlocked with the strut 474. For example, the strut 474 is provided with a gear portion meshed with the gear 475. For example, the base portion 402 is interlocked with the gear 475.

For example, when the motor 471 rotates, rotation of the motor 471 is transmitted to the base portion 402 via the gear 472, the gear 473, the strut 474, and the gear 475. Accordingly, the base portion 402 can turn while having the first rotary shaft A1 as the center. Naturally, as the configuration of transmitting driving of the motor 471 to the base portion 402, various types of configurations can be applied. In the present Example, when the rotational direction of the motor 471 is switched, the rotational direction of each gear is changed. Accordingly, the turning direction having the first rotary shaft A1 of the base portion 402 as the center can be switched.

In this manner, the first turning unit 470 turns the base portion 402 with respect to the support base block 401 while having the first rotary shaft A1 as the center. For example, the support base block 401 is fixed to the base portion 170. For example, the second rotary shaft A2 is interlocked with the base portion 402. For example, the holding portion 410, the second processing tool 430, the second turning unit 480, and the like are fixed to the second rotary shaft A2. The third processing tool 440 is interlocked with the second rotary shaft A2 (second processing tool 430) via the holding portion 410. In addition, the motor 421 is interlocked with the second rotary shaft A2 via the second turning unit 480.

As described above, according to the configuration in which various types of members are attached to the base portion 402, the first turning unit 470 can turn the holding portion 410, the second processing tool 430, the third processing tool 440, the second turning unit 480, the motor 421, and the like while having the first rotary shaft A1 as the center. The first turning unit 470 is acceptable as long as the first turning unit 470 is configured to be able to turn at least any of the second processing tool 430 and the third processing tool 440. In the present Example, a configuration in which the first turning unit 470 turns various types of members with respect to the support base block 401 is exemplified. However, the configuration is not limited thereto. The first turning unit 470 is acceptable as long as the first turning unit 470 is configured to be able to change the relative positional relationship between at least any one processing tool of the second processing tool 430 and the third processing tool 440, and the lens chuck shafts 102R and 102L by turning.

<Second Turning Unit>

For example, the second turning unit 480 includes the second rotary shaft A2, a base portion 481, a motor 482, a bearing (not illustrated), and the like. For example, the motor 482 is fixed to the base portion 402. In the present Example, the motor 482 can rotate the drive shaft (rotary shaft) in the forward direction and the reverse direction. For example, rotation generated by the motor 482 is transmitted to the base portion 481 via a gear (not illustrated). Accordingly, the base portion 481 rotates. Naturally, as a configuration of transmitting driving of the motor 482 to the base portion 481, various types of configurations can be applied. For example, the second rotary shaft A2 is disposed inside the base portion 402 and is rotatably interlocked with the base portion 402 via a bearing (not illustrated). For example, the second rotary shaft A2 is a rotary shaft different from the first rotary shaft A1.

For example, the motor 421 and the second rotary shaft A2 are fixed to the base portion 481. For example, the second rotary shaft A2 is fixed to the rotation center of the base portion 481. That is, when rotation of the motor 482 is transmitted to the base portion 481, the base portion 481 rotates, and the second rotary shaft A2 and the motor 421 rotate with respect to the base portion 402.

For example, the holding portion 410, the second processing tool 430, and the like are fixed to the second rotary shaft A2. The third processing tool 440 is interlocked with the second rotary shaft A2 (second processing tool 430) via the holding portion 410. For example, the processing tool drive shaft 430a having the second processing tool 430 attached thereto is disposed inside the second rotary shaft A2 so as to be coaxial with the second rotary shaft A2. Therefore, when the second rotary shaft A2 rotates in accordance with rotation of the base portion 481, the holding portion 410 rotates while having the second rotary shaft A2 as the center. Accordingly, the third processing tool 440 held by the holding portion 410 turns while having the second rotary shaft A2 as the center. That is, the second turning unit 480 can turn the third processing tool 440 while having the second rotary shaft A2 as the center. The second turning unit 480 is acceptable as long as the second turning unit 480 is configured to be able to turn at least the third processing tool 440.

For example, in the present Example, when the rotational direction of the motor 482 is switched, the rotational direction of each gear is changed. Accordingly, the rotational direction having the second rotary shaft A2 of the base portion 481 as the center can be switched. That is, when the rotational direction of the motor 482 is switched, the turning direction of the third processing tool 440 is switched.

In the present Example, a configuration in which the second turning unit 480 turns various types of members with respect to the base portion 402 is exemplified. However, the configuration is not limited thereto. The second turning unit 480 is acceptable as long as the second turning unit 480 is configured to be able to change the relative positional relationship between the third processing tool 440 and the lens chuck shafts 102R and 102L by turning.

<Processing Water Supply Portion>

In the present Example, the eyeglass lens processing apparatus 1 includes a processing chamber (not illustrated) in which a lens is processed. In the processing chamber, the nozzle 61 for lens processing extends as a processing water supply portion (supply portion). During processing of the lens LE, the processing water is supplied through the nozzle.

<Control Portion>

Figure 3:
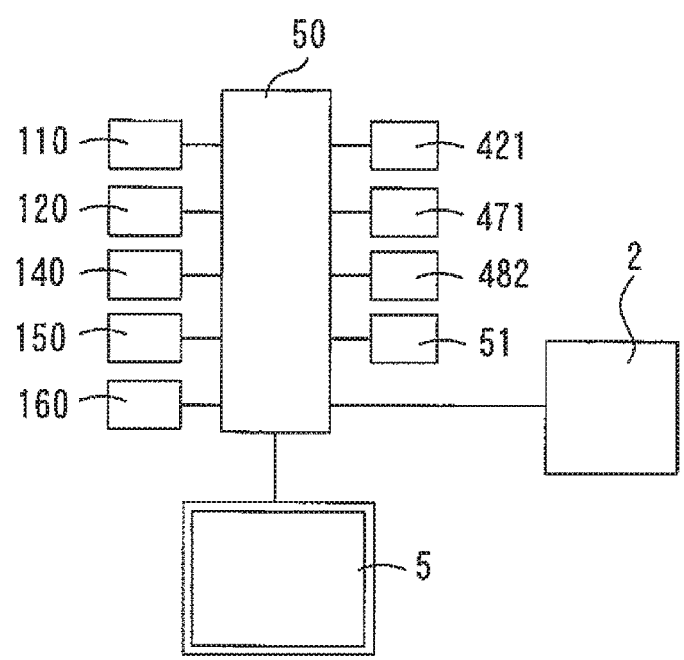
FIG. 3 is a control block diagram related to the eyeglass lens processing apparatus.

FIG. 3 is a control block diagram related to the eyeglass lens processing apparatus 1. A non-volatile memory (storage portion) 51, the lens holding portion (lens holding unit) 100, the lens shape measuring unit 200, the first processing tool unit 300, the second processing tool unit 400, a display 5, and the like are connected to the control section 50.

For example, the control section 50 includes a CPU (processor), a RAM, a ROM, and the like. The CPU of the control section 50 takes charge of controlling the apparatus in its entirety including the drive portions (for example, the motors 110, 120, 145, 150, 160, 421, 471, and 482) of the portions and the units, and the like. The RAM temporarily stores various types of information. In the ROM of the control section 50, various types of programs for controlling operations of the apparatus in its entirety, initial values, and the like are stored. The control section 50 may be configured to have a plurality of control sections (that is, plurality of processors). The non-volatile memory (storage portion) 51 is a non-transient storage medium which can retain the stored contents even if supplying of a power source is shut off. For example, a hard disk drive, a flash ROM, a USB memory detachably installed in the eyeglass lens processing apparatus 1, and the like can be used as the non-volatile memory (memory) 51.

For example, in the present Example, as the display 5, a touch panel-type display is used. In a case where the display 5 is the touch panel, the display 5 functions as the operation portion (operation unit). In this case, the control section 50 receives an input signal through the touch panel function included in the display 5 and controls displaying of features and information in the display 5. Naturally, the eyeglass lens processing apparatus 1 may be configured to be provided with the operation portion. In this case, for example, as the operation portion, for example, at least any of a mouse, a joystick, a keyboard, a touch panel, and the like may be used. In the present Example, description will be given by exemplifying a configuration in which the display 5 functions as the operation portion.

In addition, in the present Example, the eyeglass lens processing apparatus 1 is connected to an eyeglass frame shape measurement apparatus 2 (for example, refer to JP-A-2012-185490). The eyeglass lens processing apparatus 1 receives various types of data acquired by the eyeglass frame shape measurement apparatus 2 (will be described later in detail). Naturally, the eyeglass lens processing apparatus 1 and the eyeglass frame shape measurement apparatus 2 may be integrally configured. In this case, for example, a measurement mechanism of the eyeglass frame shape measurement apparatus 2 is provided in the eyeglass lens processing apparatus 1.

For example, in the present Example, in the memory 51, conditions for the rotational speed of the lens and the rotational speed of the grindstone in each of processing stages such as roughing, chips removing, finishing, chamfering, and polishing are stored. In addition, in the memory 51, processing conditions for each of processing modes (for example, the rotational speed of the processing tool and the movement speed of the processing tool) are stored.

<Control Operation>

Figure 4:
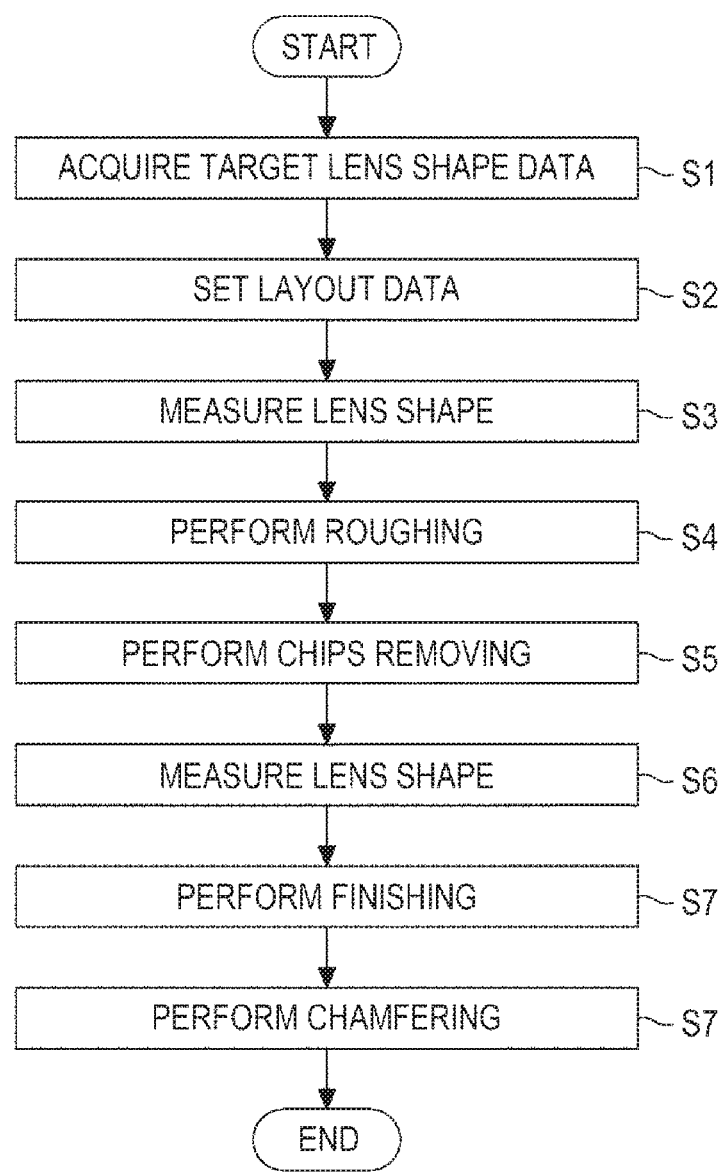
FIG. 4 is a flow chart describing an example of a control operation.

An operation of the eyeglass lens processing apparatus 1 having the above-described configuration will be described. In the present embodiment, description will be given by exemplifying a case where a grooving grindstone is used as the second processing tool 430 and the boring tool is used as the third processing tool 440. FIG. 4 is a flow chart describing an example of a control operation.

<Acquisition of Target Lens Shape Data (S1)>

For example, the target lens shape data is acquired by the eyeglass frame shape measurement apparatus 2 (S1). For example, when an eyeglass frame is measured by the eyeglass frame shape measurement apparatus 2, target lens shape data (rn, ρn) (n=1, 2, 3, and so on to N) of a lens frame is measured. When a data transmission switch (not illustrated) of the eyeglass frame shape measurement apparatus 2 is operated, the target lens shape data is transmitted from the eyeglass frame shape measurement apparatus 2 to the eyeglass lens processing apparatus 1 and is stored in the memory 51 of the eyeglass lens processing apparatus 1.

In the present embodiment, a configuration in which the target lens shape data is acquired by the eyeglass frame shape measurement apparatus 2 is exemplified. However, the configuration is not limited thereto. For example, a configuration in which after an operator detaches the demonstration lens attached to the eyeglass frame and measures the target lens shape data by reading the contour of the demonstration lens by using a contour reading device or the like may be adopted. In addition, in the present embodiment, a configuration in which when the data transmission switch (not illustrated) of the eyeglass frame shape measurement apparatus 2 is operated, the target lens shape data is transmitted from the eyeglass frame shape measurement apparatus 2 is adopted. However, the configuration is not limited thereto. For example, a configuration in which the operator inputs the target lens shape data by operating the display 5 of the eyeglass lens processing apparatus 1.

\<Setting of Layout Data (S2)\>

When the target lens shape data is acquired, the control section 50 displays a layout data setting screen for setting layout data with respect to the target lens shape data on the display 5. In the layout data setting screen, various types of processing conditions can be set (S2). For example, the operator operates the display 5 and sets the layout data such as the distance between the pupils (PD value) of a wearer, the distance (FPD value) between frame centers of an eyeglass frame F, and the height of an optical center OC with respect to a geometrical center FC of the target lens shape. In addition, for example, the operator operates the display 5 and sets the processing conditions such as the material of the lens, the type of the frame, and the processing mode (beveling, grooving, boring, and the like). For example, as the material of the lens, a plastic lens, a polycarbonate lens, or the like can be selected. In the present embodiment, a configuration of setting the layout data by operating the display 5 in the eyeglass lens processing apparatus 1 is adopted. However, the configuration is not limited thereto. For example, a configuration in which the layout data is set by using a different apparatus, a different PC (personal computer), or the like, and the eyeglass lens processing apparatus 1 (in the present embodiment, control section 50) acquires the layout data by receiving the layout data may be adopted.

In the present Example, description will be given by exemplifying a case where the processing mode for performing beveling is set as finishing (S7), and chamfering (S8) is performed. For example, in the present Example, in a case where beveling is performed, the operator operates the display 5 and selects the mode of beveling. In addition, the operator operates the display 5 and performs setting for chamfering.

In addition, in the present Example, description will be given regarding a case where a thermoplastic material is used as the lens material for the lens (thermoplastic lens). For example, the thermoplastic lens (for example, polycarbonate lens and TRIVEX) is a lens of the material in which viscosity increases when heat is applied and chips are more likely to adhere to the lens. In the present Example, as the rough grindstone for lens processing, the rough grindstone 167 for plastic (hereinafter, will be disclosed as rough grindstone) is used. Naturally, a different grindstone may be used.

\<Lens Shape Measurement (S3)\>

As described above, when data required in lens processing is acquired, the operator controls the lens chuck shafts 102R and 102L to hold the lens (in the present Example, thermoplastic lens) LE. When the operator selects a processing start switch (not illustrated) displayed by the display 5, the control section 50 starts processing of the periphery of the lens LE.

First, when the start switch is pressed, the control section 50 operates the lens edge position measuring units 200F and 200R and measures the edge positions of the front surface and the rear surface of the lens based on the target lens shape data. For example, the control section 50 acquires information of a position (position in a direction of lens chuck shafts) corresponding to the target lens shape in the refractive surface of the front surface and the refractive surface of the rear surface of the lens. In this case, the control section 50 acquires the refractive surface of the front surface shape (inclination information) and the refractive surface of the rear surface shape (inclination information) obtained by the lens edge position measuring units 200F and 200R. For example, the refractive surface of the front surface shape can be mathematically acquired by using at least four points within data of the refractive surface of the front surface corresponding to the target lens shape. In addition, the refractive surface of the front surface shape can be mathematically acquired by acquiring the positional information of different distances for each directional angle of radius vector from the chuck center of the lens in the vicinity of the position corresponding to the target lens shape. Naturally, the refractive surface shape may be calculated through a computation different from that described above. When the position of the edge of the lens is measured, it is checked whether or not the diameter of the unprocessed lens LE is insufficient with respect to the target lens shape.

\<Roughing (S4)\>

When the lens shape measurement is completed, the control section 50 starts performing roughing (S4). In order to rough the periphery of the lens LE based on the target lens shape data and the layout data, the control section 50 obtains the processing control data (control data) for driving each of the members. When the roughing control data is acquired, the control section 50 controls driving of the motor 145 for X-axis movement and positions the lens LE on the rough grindstone 167. Thereafter, the control section 50 controls driving of the motor 150 for Y-axis movement based on the roughing control data while rotating the lens LE by the motor 120. The periphery of the lens LE is roughed through a plurality times of rotations of the lens LE.

\<Chips Removing (S5)\>

For example, after performing roughing of the lens based on the roughing control data, the control section 50 processes the corner portion of the edge of the lens after roughing the lens based on the corner portion processing control data to remove the chips adhering to the lens through roughing. The removing of the chips adhering to the lens through roughing is not limited to a configuration in which the chips are completely removed. A configuration of reducing the chips may be adopted.

For example, in a case where the lens shape measurement for finishing (S6) is executed in a state where the chips adhere to the lens, the lens edge position measuring unit 200F comes into contact with the chips, and a favorable shape of the lens cannot be acquired. That is, the lens edge position measuring unit 200F runs on the chips, and thus, it is difficult to favorably measure the edge positions of the front surface and the rear surface of the lens based on the target lens shape data (refer to FIG. 7A). Therefore, the processing of removing the chips is performed.

Figure 5A:
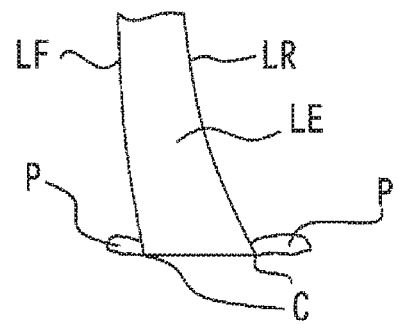
FIGS. 5A to 5C are views describing chips removing.
Figure 5B:
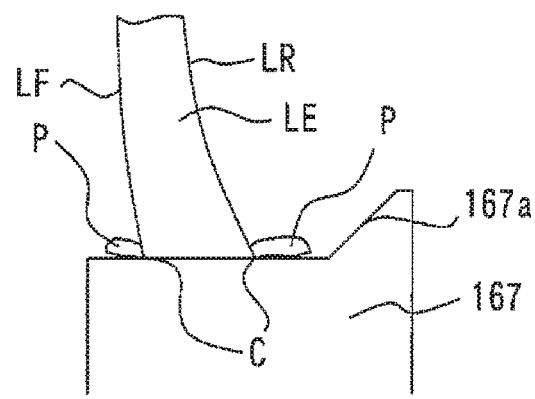
Figure 5C:
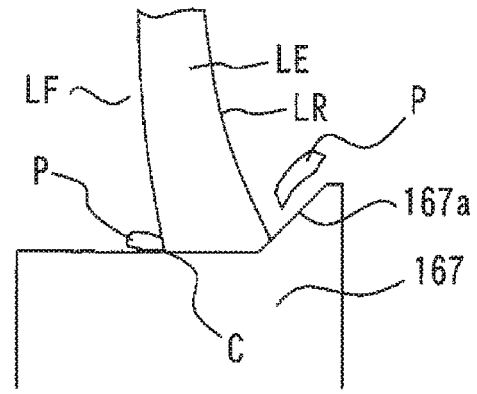

FIGS. 5A to 5C are views describing chips removing. In FIGS. 5A to 5C, a case of removing only chips P on a rear surface LR side of the lens is exemplified. However, a front surface LF side of the lens can also be similarly processed. Removing of the chips P is acceptable as long as the chips P on a surface on the side of executing the lens shape measurement between the front surface LF of the lens and the rear surface LR of the lens are at least removed in the lens shape measurement (S6) (will be described later). That is, in a case of measuring only the front surface LF of the lens in the lens shape measurement (S6), removing is acceptable as long as at least the chips P on the front surface LF side of the lens are removed. In this case, the lens shape data of the rear surface LR of the lens may be calculated based on the lens shape data of the measured front surface LF of the lens and the lens shape data acquired before performing roughing, after the front surface LF of the lens is measured.

As illustrated in FIG. 5A, in a case where the lens LE roughed, the chips P adhere to a corner portion C of the edge of the lens (corner portion region). When roughing is performed, the quantity of the adhered chips in a case where processing is performed through a down-cut method (processing method in which the rotational direction of processing tool is a direction different from the rotational direction of the lens) is greater compared to that in a case where processing is performed through the up-cut method (processing method in which the rotational direction of processing tool is the same direction as the rotational direction of the lens). For example, more chips adhere in a case of the down-cut method because the chips of the lens are discharged toward the region of the processed lens. In the present Example, in chips removing, processing is performed through the up-cut method. For example, when the corner portion of the edge of the lens is processed, if the processing is performed through the up-cut method, in a case of processing the thermoplastic lens, the chips generated when the corner portion of the edge is processed can be restrained from adhering to the lens after the corner portion of the edge is processed. Accordingly, the lens shape measurement after roughing is performed can be more accurately performed, and finishing after roughing is performed can be more accurately performed.

For example, the control section 50 calculates the positional data related to the corner portion C of the edge of the lens LE before finishing the lens and after roughing the lens, based on the lens shape data measured in the lens shape measurement (S3), and the target lens shape data. For example, as the lens shape data, at least any of the edge thickness (thickness of the edge), the refractive surface shape of the front surface LF of the lens (curve value), and the refractive surface shape of the rear surface LR of the lens (curve value) may be adopted. In the present Example, as the lens shape data, the edge thickness, the refractive surface shape of the front surface LF of the lens, and the refractive surface shape of the rear surface LR of the lens are used.

For example, the control section 50 acquires the corner portion processing control data for removing the chips P adhering to the lens LE, based on the acquired positional data of the corner portion C of the edge. In the present Example, a case where the corner portion processing control data for processing the corner portion C of the edge is acquired as the corner portion processing control data by causing the rough grindstone 167 and the corner portion C of the edge of the lens LE after roughing the lens to come into contact with each other is exemplified. In this manner, when the corner portion C of the edge of the lens LE is processed, the chips P which have adhered to the corner portion C of the edge (corner portion region) can be removed.

In the present Example, for example, as the processing of the corner portion C of the edge performed by causing the rough grindstone 167 and the corner portion C of the edge of the lens LE after roughing the lens to come into contact with each other, description is given by exemplifying a configuration of processing the corner portion C of the edge by causing the corner portion C of the edge and the rough grindstone 167 to come into contact with each other. However, the configuration is not limited thereto. For example, as the processing of the corner portion C of the edge performed by causing the rough grindstone 167 and the corner portion C of the edge of the lens LE after roughing the lens to come into contact with each other, a configuration of processing the corner portion C of the edge or the peripheral region of the corner portion C of the edge by causing the peripheral region of the corner portion C of the edge and the rough grindstone 167 to come into contact with each other may be adopted. In addition, for example, as the processing of the corner portion C of the edge performed by causing the rough grindstone 167 and the corner portion C of the edge of the lens LE after roughing the lens to come into contact with each other, a configuration of processing the chips by causing the rough grindstone 167 to come into contact with the chips which have adhered to the region of the edge corner portion C may be adopted.

For example, when the corner portion processing control data is acquired, the control section 50 controls the movement portion so as process the corner portion C of the edge of the lens LE to remove the chips P adhering to the lens LE. For example, as illustrated in FIG. 5C, the control section 50 controls driving of the motor 150 for Y-axis movement based on the corner portion processing control data and positions the lens LE on the rough grindstone 167. Subsequently, as illustrated in FIG. 5C, the control section 50 controls driving of the motor 145 for X-axis movement based on the corner portion processing control data, shifts the lens LE in the X-axis direction, and moves the lens LE toward a slope 167a at the end portion of the rough grindstone 167. Accordingly, the corner portion of the edge of the lens is processed by being in contact with the slope 167a at the end portion of the rough grindstone 167, and the chips P of the lens LE are removed.

Hereinafter, chips removing will be described in more detail. For example, the processing quantity of the edge corner portion is input. For example, the processing quantity may be set by the processing person such that a predetermined processing quantity is input. In addition, for example, the processing quantity may be set by automatically calculating a proper processing quantity based on the positional data related to the corner portion C of the edge of the lens LE before finishing the lens and after roughing the lens. In addition, for example, as the processing quantity, a predetermined processing quantity may be set in advance (for example, processing quantity calculated through a simulation, an experiment, or the like as the processing quantity of the chips which can be removed). In addition, for example, a predetermined processing quantity (for example, processing quantity calculated through a simulation, an experiment, or the like as the processing quantity of the chips which can be removed) may be set so as to be able to be selected in stages, and the processing quantity may be set by the processing person such that a desired processing quantity is selected.

Figure 6:
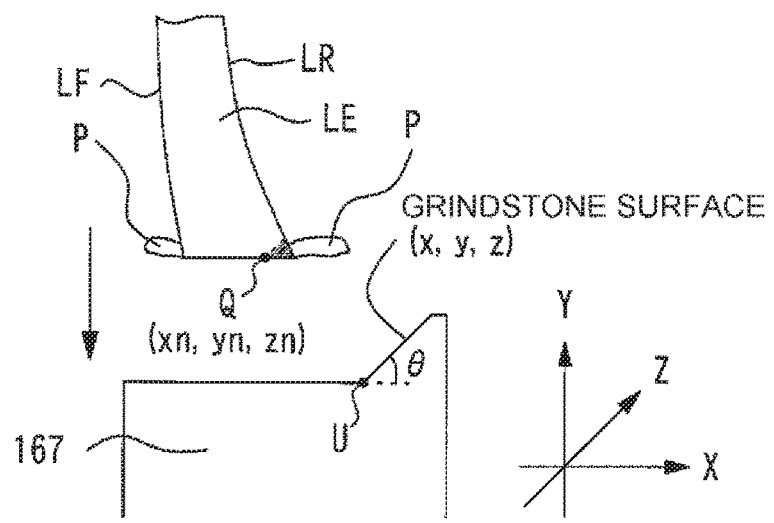
FIG. 6 is a view describing a method of calculating corner portion processing control data for removing a corner portion of an edge on a rear surface of a lens.

FIG. 6 is a view describing a method of calculating the corner portion processing control data for removing the corner portion of the edge on the rear surface of the lens. In FIG. 6, the method of calculating the corner portion processing control data of the rear surface of the lens is described. However, in the corner portion processing control data for removing the corner portion of the edge on the front surface of the lens, calculation can be performed through a method similar to the calculating method for the rear surface of the lens.

For example, the control section 50 obtains a processing point Q for processing the corner portion of the edge with respect to the rear surface of the lens, based on the positional data of the corner portion of the edge and the processing quantity of the edge corner portion over the whole circumference, thereby acquiring a corner portion processing trajectory (xn, yn, zn) (n=1, 2, 3, and so on to N).

For example, first, the control section 50 calculates the control data of the Y-axis direction in the corner portion processing control data. The control section 50 calculates the processing control data of the shaft-to-shaft distance (Y-axis direction) between the lens rotary shaft 102L and 102R and the grindstone rotary shaft 161a such that the processing point Q in the Y-axis direction and a Z-axis direction and a processing point U on a grindstone surface (can be arbitrarily set on the grindstone surface) coincide with each other.

In the present Example, rotation of the lens chuck shaft 102L and 102R (rotation of lens) and the shaft-to-shaft distance between the lens rotary shaft 102L and 102R and the grindstone rotary shaft 161a (Y-directional movement unit 100c) are controlled, thereby adjusting the shaft-to-shaft distance of the lens chuck shaft 102L and 102R in the Y-axis direction and the Z-axis direction.

For example, the control section 50 calculates the control data of the Y-axis direction for each rotation angle of the lens. After calculating the control data of the Y-axis direction, the control section 50 calculates the control data of the X-axis direction in the corner portion processing control data.

Here, in the present Example, when the processing of the corner portion of the edge is executed at a predetermined processing position, since the rough grindstone 167 has a significant diameter, the lens LE and the rough grindstone 167 interfere with each other at a position other than the processing position of the corner portion of the edge. Accordingly, there are cases where the lens shape after the corner portion is processed becomes a shape different from the expected shape. Therefore, the control section 50 obtains the control data of the X-axis direction in the corner portion processing control data based on the acquired corner portion processing trajectory so as to avoid interference between the lens LE and the rough grindstone 167. For example, the grindstone surface of the rough grindstone 167 is expressed through the following expression.

$$(y-Y)^2+(z-Z)^2=(x-X)^2 \tan^2 \theta \quad \text{[Expression 1]}$$

Here, the factor X indicates a distance of a virtual apex (virtual apex of a conical grindstone in a case where the slope 167a of the end portion of the rough grindstone 167 is considered as the conical grindstone) of the slope 167a of the end portion of the rough grindstone 167 in the lens chuck shaft direction (X-axis direction) with respect to a certain reference position (can be arbitrarily set). The factor Y indicates the shaft-to-shaft distance between the lens chuck shaft 102L and 102R and the grindstone rotary shaft 161a in the Y-axis direction. The factor Z indicates a distance between contact points of the lens and the slope 167a of the end portion of the rough grindstone 167 in the Z-axis direction. The factor $\theta$ indicates the angle of inclination of the grindstone surface. Therefore, the factor X is expressed through the following expression.

$$X=x-\{1/\tan^2 \theta \cdot [(y-Y)^2+(z-Z)^2]\}^{1/2} \quad \text{[Expression 2]}$$

The factors (x, y, z) in this mathematical expression 2 are substituted with the factors (xn, yn, zn) of the corner portion processing trajectory, and the maximum value of the factor X is obtained. The maximum value of the factor X is calculated by rotating the lens over the whole circumference by an arbitrary minute unit angle while having the lens rotary shaft as the center. In this manner, the control data of the corner portion in the X-axis direction for executing the processing of the corner portion of the edge by the rough grindstone 167 is calculated.

As described above, after calculating the corner portion processing control data of the Y-axis direction, the control section 50 acquires the corner portion processing control data by calculating the corner portion processing control data of the X-axis direction. For example, the control section 50 performs processing based on the calculated corner portion processing control data by causing the corner portion of the edge of the lens to come into contact with the slope 167a of the end portion of the rough grindstone 167, thereby removing the chips P of the lens LE.

In this manner, for example, when the corner portion of the edge of the lens is processed based on the positional data related to the corner portion of the edge of the lens before finishing the lens and after roughing the lens, the chips adhering to the lens through roughing can be accurately removed.

In the present Example, for example, the control section 50 stops supplying of the processing water from the nozzle 61 for lens processing when the corner portion of the edge is processed. For example, by stopping supplying of the processing water when the corner portion of the edge of the lens is processed, the thermoplastic lens can be restrained from being cooled by the processing water when the thermoplastic lens is processed, and the processing can be restrained from not advancing. That is, in the processing of the thermoplastic lens, since the lens melts due to heat generated during processing, the lens is restrained from being cooled by the processing water. Accordingly, the lens can be restrained from not being able to be favorably processed (for example, the chips adhering to the lens can be restrained from not being able to be favorably removed, or the like).

<Lens Shape Measurement (S6)>

Figure 7A:
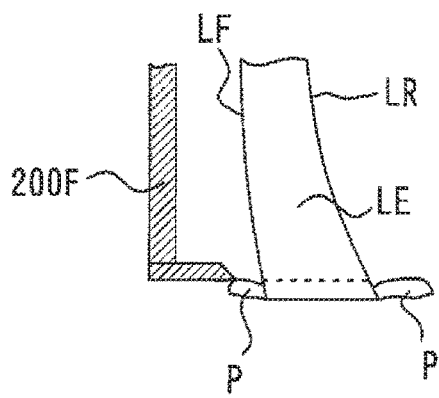
FIGS. 7A and 7B are views describing a lens shape measurement for finishing.
Figure 7B:
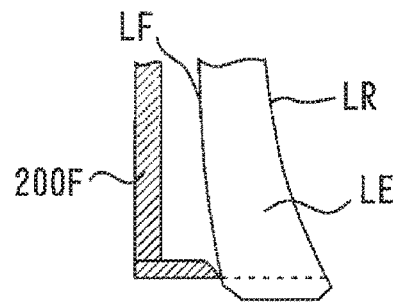

FIGS. 7A and 7B are views describing the lens shape measurement for finishing. For example, before and after roughing is performed, the shape of the lens changes. Accordingly, in a case where finishing is performed based on the lens shape data before performing finishing, since the lens shape has changed, finishing cannot be accurately performed. Therefore, it is preferable that the lens shape measurement for finishing is performed before performing finishing.

For example, after removing the chips P adhering to the lens LE, the control section 50 operates the lens edge position measuring units 200F and 200R and measures the edge position of the front surface and the rear surface of the lens based on the target lens shape data. That is, the control section 50 operates the lens edge position measuring units 200F and 200R and acquires the lens shape data.

In this case, for example, in a case where the chips P have adhered to the lens LE, the lens edge position measuring units 200F and 200R comes into contact with the chips P, and thus, measurement cannot be favorably performed. For example, as illustrated in FIG. 7A, in a case where the shape of the front surface LF of the lens is measured, in a case where the chips P have adhered to the lens LE, the lens edge position measuring unit 200F runs on the chips P, and thus, measurement cannot be favorably performed. Meanwhile, for example, in a case where the chips P are removed from the lens LE, the lens edge position measuring units 200F and 200R does not come into contact with the chips P, and thus, measurement can be favorably performed. For example, as illustrated in FIG. 7B, in a case where the shape of the front surface LF of the lens is measured, in a case where the chips P of the lens LE are removed, the lens edge position measuring unit 200F does not come into contact with the chips P, and thus, measurement can be favorably performed.

<Finishing (Beveling) (S7)>

For example, when the lens shape measurement (S6) is completed, the process proceeds to finishing (in the present embodiment, beveling) (S7). The control section 50 obtains beveling control data for beveling the lens periphery based on the target lens shape data, the measured lens shape data for performing finishing, and the like (for example, refer to JP-A-5-212661).

For example, the control section 50 controls the movement portion based on the beveling control data and performs beveling of the lens. For example, the control section 50 controls driving of the motor 145 for X-axis movement and positions the lens LE on the V-groove (bevel groove) of the finishing grindstone 164. Thereafter, the control section 50 controls the motor 150 for Y-axis movement based on the beveling control data and performs beveling by using the finishing grindstone 164.

For example, when beveling is completed, the process proceeds to next processing. For example, in a case where chamfering is set to be performed, the process proceeds to a chamfering mode.

<Chamfering (S8)>

For example, when finishing is completed, the control section 50 performs chamfering (S8) in which the corner portion of the edge of the lens after finishing the lens is processed. For example, the control section 50 acquires the chamfering control data for processing the corner portion of the edge of the lens after finishing the lens, based on the target lens shape data, the measured lens shape data for performing finishing, and the like.

For example, the control section 50 controls the movement portion based on the chamfering control data and processes the corner portion of the edge of the lens after finishing the lens. In the present Example, description will be given by exemplifying a case where chamfering is performed by using the second processing tool 430. Naturally, chamfering may be performed by using a different processing tool. For example, the control section 50 controls driving of the motor 145 for X-axis movement and positions the lens LE on the second processing tool 430. Thereafter, the control section 50 controls the motor 150 for Y-axis movement based on the chamfering control data, thereby performing chamfering by using the second processing tool 430.

As described above, for example, the chips adhering to the lens after roughing the lens can be removed based on the positional data related to the corner portion of the edge of the lens before finishing the lens and after roughing the lens. Therefore, the lens shape measurement after performing roughing can be accurately performed. Accordingly, finishing after roughing is performed can be accurately performed. That is, various types of lenses can be favorably processed.

What is claimed is:

1. An eyeglass lens processing apparatus comprising:
a processing tool configured to process a periphery of a lens;
a movement portion configured to change a relative position between the lens and the processing tool;
a processor;
memory storing computer readable instructions, which executed by the processor, causing the eyeglass lens processing apparatus to execute:
acquiring positional data related to a corner portion of an edge of the lens before the lens is finished and after the lens is roughed;
acquiring corner portion processing control data for removing a chip adhering to the lens through roughing, based on the acquired positional data; and
controlling the a movement portion based on the corner portion processing control data so as to remove the chip adhering to the lens; and wherein
finishing control data for finishing the lens is acquired based on lens shape data acquired by measuring the shape of the lens by using a lens shape measuring portion after the chips adhering to the lens are removed by the processing tool, and
the movement portion is controlled based on the finishing control data to finish of the lens.

2. The eyeglass lens processing apparatus according to claim 1, wherein
the corner portion processing control data is acquired by bringing the processing tool and the corner portion of the edge of the lens after the lens is roughed into contact with each other based on the positional data acquired by the positional data acquiring portion, and
the movement portion is controlled based on the corner portion processing control data to process the corner portion of the edge of the lens to remove the chips adhering to the lens.

3. The eyeglass lens processing apparatus according to claim 2, wherein after performing roughing of the lens by controlling the movement portion based on roughing control data, the movement portion is controlled based on the corner portion processing control data to process the corner portion of the edge of the lens after the lens is roughed to remove the chip adhering to the lens.

4. The eyeglass lens processing apparatus according to claim 3, wherein
the roughing includes a first stage in which the processing tool cuts the lens without rotating the lens in a plurality of lens rotation angle directions by controlling the movement portion based on the roughing control data, and a second stage in which the processing tool processes the lens while the lens is rotated,
the second stage is performed after the first stage.

5. The eyeglass lens processing apparatus according to claim 1 further comprising:
a supply portion configured to supply processing water in a direction toward a contact position between the lens and the processing tool when the lens is processed; and
a supply control portion configured to stop supplying of the processing water from the supply portion when the corner portion of the edge is processed.

6. The eyeglass lens processing apparatus according to claim 1,
wherein the lens is processed through an up-cut method when the corner portion of the edge is processed.

7. The eyeglass lens processing apparatus according to claim 1, wherein
the computer readable instructions when executed by the processor causes the eyeglass lens processing apparatus to acquire chamfering control data for processing the corner portion of the edge of the lens after the lens is finished, and
the movement portion is controlled based on the chamfering control data so as to process the corner portion of the edge of the lens after the lens is finished.

8. The eyeglass lens processing apparatus according to claim 1, wherein the finishing control data for finishing the lens is a plano-processing finish.

9. The eyeglass lens processing apparatus according to claim 1, wherein the finishing control data for finishing the lens is a beveling finish.

10. A non-transitory computer readable medium storing an eyeglass lens processing program to be executed by a processor of an eyeglass lens processing apparatus for processing a periphery of the lens, the eyeglass lens processing apparatus including a processing tool processing a lens and a movement portion configured to change a relative position between the lens and the processing tool, the eyeglass lens processing program, when executed by the processor, causing the eyeglass lens processing apparatus to execute:

acquiring positional data related to a corner portion of an edge of the lens before the lens is finished and after the lens is roughed;

acquiring corner portion processing control data for removing a chip adhering to the lens through roughing, based on the acquired positional data; and controlling the movement portion based on the corner portion processing control data so as to remove the chip adhering to the lens;

wherein finishing control data for finishing the lens is acquired based on lens shape data acquired by measuring the shape of the lens by using a lens shape measuring portion after the chips adhering to the lens are removed by the processing tool, and the movement portion is controlled based on the finishing control data to finish of the lens.

11. An eyeglass lens processing apparatus comprising:

a processing tool configured to process a periphery of a lens;

a movement portion configured to change a relative position between the lens and the processing tool a processor;

memory storing computer readable instructions, which executed by the processor, causing the eyeglass lens processing apparatus to execute:

acquiring positional data related to a corner portion of an edge of the lens before the lens is finished and after the lens is roughed;

acquiring corner portion processing control data for removing a chip adhering to the lens through roughing, based on the acquired positional data; and controlling the a movement portion based on the corner portion processing control data so as to remove the chip adhering to the lens;

wherein:

the corner portion processing control data is acquired by bringing the processing tool and the corner portion of the edge of the lens after the lens is roughed into contact with each other based on the positional data acquired by the positional data acquiring portion, the movement portion is controlled based on the corner portion processing control data to process the corner portion of the edge of the lens to remove the chips adhering to the lens;

after performing roughing of the lens by controlling the movement portion based on roughing control data, the movement portion is controlled based on the corner portion processing control data to process the corner portion of the edge of the lens after the lens is roughed to remove the chip adhering to the lens;

the roughing includes a first stage in which the processing tool cuts the lens without rotating the lens in a plurality of lens rotation angle directions by controlling the movement portion based on the roughing control data, and a second stage in which the processing tool processes the lens while the lens is rotated, and the second stage is performed after the first stage.

* * * * *